Jan. 13, 1942.   S. LUDWIG   2,269,947
ANTENNA MOUNTING
Filed Oct. 26, 1939
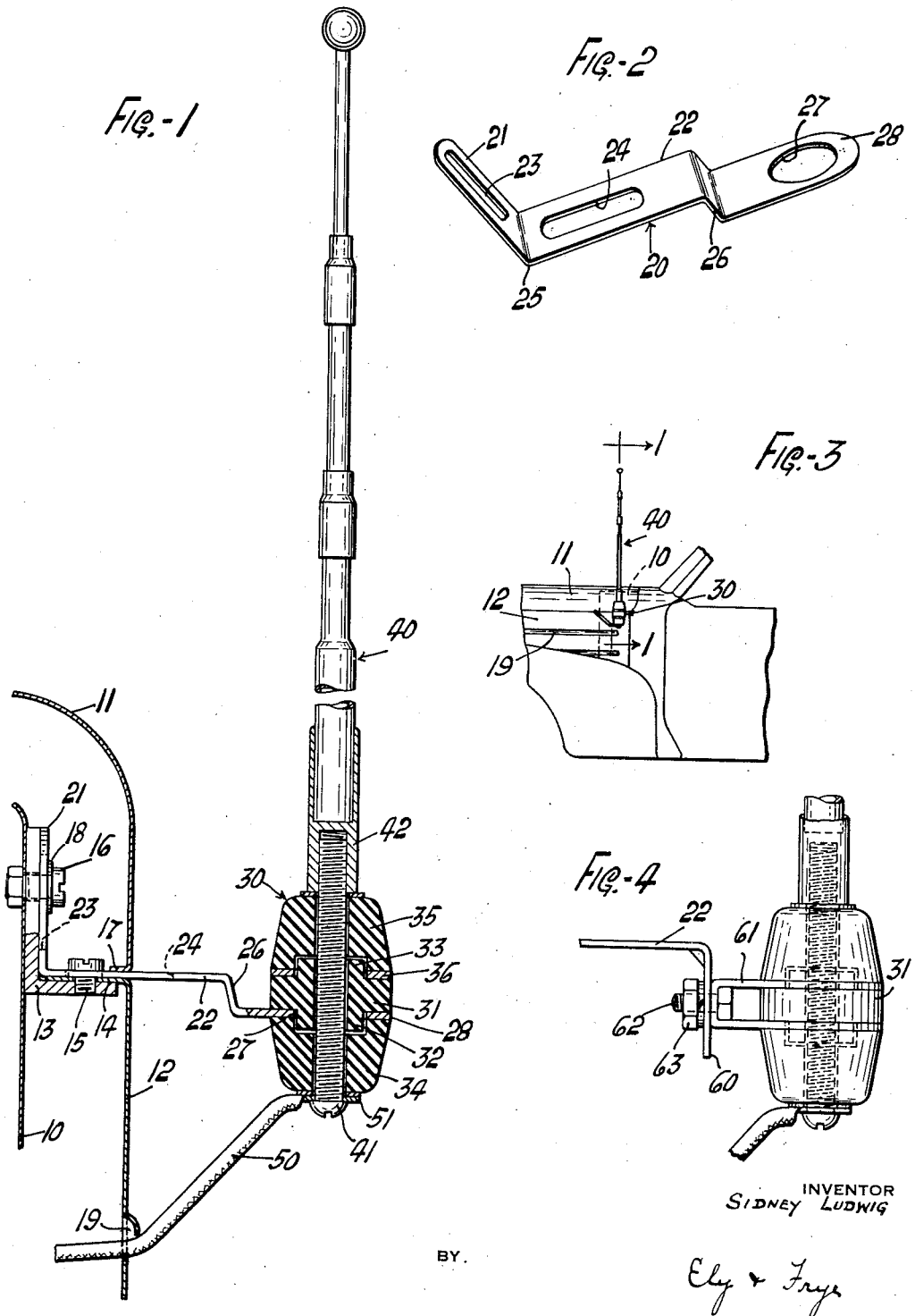
INVENTOR
SIDNEY LUDWIG
BY
Ely & Frye
ATTORNEYS Patented Jan. 13, 1942

2,269,947

UNITED STATES PATENT OFFICE 2,269,947

ANTENNA MOUNTING

Sidney Ludwig, Cleveland, Ohio, assignor to The Ward Products Corporation, Cleveland, Ohio, a corporation of Ohio Application October 26, 1939, Serial No. 301,413

6 Claims. (Cl. 250—33)

This invention relates to an improvement in automobile radio antenna mountings and, more particularly, to an automobile antenna mounting adapted to permit the mounting of an antenna adjacent the side cowl of an automobile.

Antennas of the "fishing rod" type are almost universally employed for automobile radio receivers. Such antennas are most conveniently mounted adjacent the side of the cowl of the automobile. By so mounting this antenna, the shielded lead-in may be as short as possible and the driver may conveniently raise or lower the antenna if it is of the manually operated telescopic type, such as is shown in U. S. Patent No. 2,152,316, issued to Roman Kopanski on March 28, 1939.

Side cowl antennas have been extremely difficult to install heretofore, since it has been necessary to drill holes through the side cowl wall of the automobile to receive the one or more side cowl antenna mountings and to remove the adjacent upholstery panel inside the automobile to secure the antenna mounting and the shielded lead-in. The installations of side cowl antenna mountings, therefore, have been tedious tasks requiring the use of special tools and the services of skilled mechanics. Furthermore, the owners of automobiles frequently object to the high installation charges and also dislike to have their automobiles thus permanently marred, especially if their automobiles are new.

It is an object of this invention to provide an automobile antenna mounting which may be quickly and conveniently mounted adjacent the automobile cowl by ordinary mechanics using common tools and which will not require drilling in order to secure the antenna mounting to the automobile body. It is also an object of this invention to provide an antenna mounting bracket which is adapted to be secured to the cowl by a body bolt and to extend outwardly therefrom between the flanges of the top and side panel of an alligator hood.

It is a further object of this invention to provide an automobile antenna mounting which will permit a short shielded lead-in to be led from the antenna through the louver in the hood side panel and firewall openings to the automobile radio receiving set. It is also an object of this invention to provide an antenna insulator which will permit an antenna to be supported by a single mounting bracket.

Other and further objects and advantages of this invention will be apparent from the following specification and claims and from the drawing, in which Fig. 1 is a detailed elevation partly in section, taken along the line 1—1 of Fig. 3 and illustrating the improved antenna mounting and the manner of securing it to the cowl of an automobile;

Fig. 2 is an isometric view of the mounting bracket;

Fig. 3 is a fragmentary side view of an automobile showing the antenna mounting secured thereto and showing an alternate method of bringing the lead-in into the automobile; and Fig. 4 is a detail elevation taken from Fig. 1 and illustrating a modification of this invention.

In the drawing, in which like reference characters refer to like parts, 10 is the wall of the cowl of the automobile. In automobiles having the well-known alligator type of hood, the type now universally used, only the rear portion of the cowl wall is used as an exterior panel of the automobile body. The front portion of the cowl extends forwardly underneath and is normally covered by the hood top 11 and side panels 12, as is shown in Fig. 3 of the drawing. The hood top 11 is supported on the cowl wall 10 by a suitable hinge (not shown). The side panel 12 is supported on the side of the cowl by a bracket 13 which engages a horizontal flange 14 of the panel 12 and is usually removably secured to the cowl by a flange bolt 15, clips, or the like. The bracket 13 is secured to the cowl wall 10 by a body bolt 16. The top 11 is provided with a flange 17 which normally engages the flange 14, forming the joint between the hood top 11 and side panel 12 which extends the length of the hood.

The antenna mounting bracket 20 comprises a vertical arm 21 and a horizontal arm 22. The arm 21 is provided with a long slot 23 adapted to receive the body bolt 16 which, as shown in Fig. 1, secures the bracket 20 to the cowl wall 10. A washer 18 may be conveniently interposed between the bolt 16 and bracket 20, as shown. The horizontal arm 22 is provided with a slot 24 which is located near the junction 25 of the arms 21 and 22 so that the arm 21 may be placed over the side panel flange bolt 15. The arm 22 may be of any suitable section, but is preferably rather thin adjacent the junction 25 so that it may extend between the flanges 14 and 17 when the top 11 is closed. The arm 22 should be thin enough so that it does not tend to distort the top 11 or strain the top hinge when the top 11 is fastened shut, and yet the arm 22 is preferably made thick enough so that it is normally firmly engaged by the top and side panel flanges and is thereby prevented from twisting under normal loads. Because the arm 22 is so engaged by the flanges 14 and 17, the slot 24 does not effectively weaken the arm 22. As a further means for stiffening the portion of the arm 22 which extends beyond the side panel 12, an offset 26 may be provided. The arm 22 may also be additionally reinforced by suitable corrugations, or the like.

The outer end of the bracket arm 22 is provided with an opening 27 which is adapted to receive the ring 31 of the antenna insulator 30. Since the antenna insulator 30 is preferably substantially cylindrical, the outer end of the bracket arm 22 is preferably semi-circular and concentric with the opening 27.

As shown in Fig. 1, the insulator 30, which may be of any suitable plastic, ceramic, or like material, comprises a ring 31 having a pair of bosses 32 and 33 and a pair of caps 34 and 35 which are recessed to receive and engage the bosses 32 and 33. The boss 32 extends through the opening 27 in the bracket arm 22 which is engaged by the ring 31 and cap 34. To balance the appearance of the insulator 30, a metal washer 36 is preferably fitted over the boss 33 between the ring 31 and cap 35. The appearance of the insulator may be further enhanced by making the caps 34 and 35 and ring 31 of different colors.

The insulator 30 is cored to receive the antenna bolt 41 which carries the clip 51 of the shielded and insulated lead-in 50. The antenna bolt 41 extends through the insulator 30 and is threaded in the socket 42 of the antenna rod 40, which may be of the manually operable telescopic type as shown.

The antenna, insulator, and mounting bracket are assembled by successively placing the lead-in clip 51, cap 34, bracket arm 22, ring 31, washer 36, and cap 35 on the antenna bolt 41. Then, by securing the bolt 41 in the antenna rod socket 42, the antenna and mounting are assembled into a complete unitary structure ready for installation.

To install the antenna, it is only necessary to remove the body bolt 16 and then replace the bolt 16 so that it fastens the bracket 20 to the cowl wall 10. The lead-in 50 may then be threaded through the louver 19 in the side panel 12, as shown in Fig. 1, or, preferably, between the top and side panel joint, as shown in Fig. 3, to the radio receiving set through any suitable opening in the firewall, as, for example, through the opening for the steering column or through one of the "knockouts" provided in the firewall by most automobile manufacturers.

The antenna and mounting may be thus secured to any automobile having an alligator hood. Although the vertical distance between the body bolt 16 and the joint between the top 11 and side panel 12 may vary in different makes of automobiles, ample tolerance for such variations is provided by the long slot 23. All makes of automobiles having alligator hoods employ a removable body bolt 16 in the forward side cowl wall adjacent the joint between the top and side panel of the hood, but, if it is not convenient to employ such a body bolt for fastening the bracket 20 to the cowl wall 10, an opening, which will receive a bolt for securing the bracket 20, may be easily punched in the wall 10 with an ordinary cold chisel or screw driver. Since the portion of the cowl wall in which such an opening would be punched is concealed by the hood top 11, the automobile would not be marred by the opening. Furthermore, the antenna may be removed at the time the automobile is resold without marring the external surface of the automobile.

From the foregoing, it is apparent that this invention permits an antenna to be mounted readily and inexpensively on the side cowl of an automobile by a mechanic using ordinary tools. Furthermore, the automobile is not marred by the mounting. This invention, however, is not restricted to the preferred embodiment. For example, in the preferred embodiment shown in Fig. 1, the antenna, when mounted, is fixed rigidly in a vertical position. It may be desirable, however, to mount the antena so that it will slope in a direction parallel to the slant of the windshield of the automobile. A means accomplishing such a result is illustrated in Fig. 4.

In the modification illustrated in Fig. 4, the bracket arm 22 is provided with a downwardly depending portion 60. A U-shaped member 61, provided with openings in the arms thereof, is pivotably mounted on the portion 60 by the bolt 62 and nut 63. The arms of the U-shaped member 60 may be opened to receive the insulator 31, the bosses thereof being engaged by the openings in the arms of the U-shaped member. The antenna and insulator are then assembled and the assembly may be installed in the described manner. Then, by pivoting the antenna on the bolt 62 to the desired slope and locking the nut 63, the antenna may be fixed in any desired position.

It is apparent, therefore, that this invention is not restricted to the embodiments disclosed, either in whole or in part, but is only limited by the appended claims.

What is claimed is:

1. An antenna and mounting comprising a bracket, a vertical arm on said bracket slotted to receive a body bolt and adapted to be secured to the side cowl wall of an automobile, a substantially horizontal arm on said bracket having a vertically thin section adjacent the junction of said horizontal and vertical arms adapted to be engaged by the hood top and side panel of an alligator automobile hood, said horizontal arm having an opening in the outer portion thereof to receive an insulator ring, an insulator ring, an insulator cap engaging said horizontal bracket arm, an antenna rod, a socket on said antenna rod, a lead-in adapted to be threaded through a louver in an automobile hood, and an antenna bolt, engaged in said socket to maintain said bracket, insulator ring, insulator cap, lead-in, and antenna as a unitary assembly.

2. An antenna mounting comprising a bracket, a vertical arm on said bracket adapted to be secured to the side cowl wall of an automobile beneath the hood thereof, a substantially horizontal arm on said bracket adapted to extend between the joint of the hood top and side panel of an alligator automobile hood, an antenna, an insulator, a lead-in, and an antenna bolt securing said bracket, antenna, insulator, and lead-in in a unitary assembly.

3. An antenna mounting comprising a bracket, a vertical arm on said bracket adapted to be secured to the side cowl wall of an automobile beneath the hood thereof, a substantially horizontal arm on said bracket adapted to extend between the joint of the hood top and side panel of an alligator automobile hood, an antenna carried by the outer end of said horizontal arm and insulated therefrom, and a lead-in adapted to be threaded through a louver in said side panel.

4. An antenna mounting comprising a bracket, a vertical arm on said bracket adapted to be secured to the side cowl wall of an automobile beneath the hood thereof, a substantially horizontal arm on said bracket adapted to extend between the joint of the hood top and side panel of an alligator automobile hood, an insulated antenna pivotably mounted on the outer end of said horizontal bracket arm for movement in a vertical plane, and a lead-in adapted to be threaded through a louver in said side panel.

5. The combination of an alligator automobile hood comprising a top, a horizontal flange on said top, a side panel having a louver, a horizontal flange on said side panel, said flanges engaging each other to form a joint, a cowl wall extending beneath said hood, a body bolt in said cowl wall, a bracket, a vertical arm on said bracket secured to said cowl wall, a substantially horizontal arm on said bracket extending outwardly between said flanges and engaged thereby and an insulator, lead-in, and antenna carried on the outer end of said horizontal bracket arm, said lead-in being adapted to be threaded through the louver in said side panel.

6. The combination of an alligator automobile hood comprising a top, a horizontal flange on said top, a side panel having a louver, a horizontal flange on said side panel, said flanges engaging each other to form a joint, a cowl wall extending beneath said hood, a body bolt in said cowl wall, a bracket, a vertical arm on said bracket secured to said cowl wall, a substantially horizontal arm on said bracket extending outwardly between said flanges and engaged thereby, and an insulator, lead-in, and antnenna pivotably mounted upon the outer end of said horizontal bracket arm for movement in a vertical plane, said lead-in being adapted to be threaded through the louver in said side panel.

SIDNEY LUDWIG.